Aug. 8, 1933.  F. J. CHAMPLIN  1,921,728

ELECTRICAL COMPENSATING ARRANGEMENT

Filed June 8, 1931

Inventor:
Franklin J. Champlin,
by Charles V. Tullar
His Attorney.

Patented Aug. 8, 1933

1,921,728

UNITED STATES PATENT OFFICE 1,921,728

ELECTRICAL COMPENSATING ARRANGEMENT

Franklin J. Champlin, Dalton, Mass., assignor to General Electric Company, a Corporation of New York Application June 8, 1931. Serial No. 542,843

8 Claims. (Cl. 171—119)

My invention relates to electrical compensating arrangements and particularly to the phase adjustment of the voltage of stabilizers which are associated with parallel connected power and control circuits.

In my copending application, Serial No. 504,504, filed December 24, 1930, and assigned to the assignee of the present application, I have disclosed and claimed a stabilizing arrangement for the voltage of a control circuit which is energized through a transformer which also supplies a power circuit. In the particular illustrated embodiment I have shown the control circuit as one for operating a contact making voltmeter which controls the operation of an induction regulator servo motor which is energized from the power circuit. Preferably the voltage stabilizer is a transformer which inductively couples the control and power circuits and which introduces a stabilizing voltage in the control circuit when the output voltage of the supply transformer drops as a result of the voltage drop therein which is caused by the current in the power, or motor, circuit.

I have found that, with the above described arrangement, the change in power factor in the motor circuit, as the motor starts, comes up to speed, and stops, produces an impedance drop in the supply transformer which not only varies in magnitude but also in phase. As a consequence I have found it desirable to provide phase control, or adjusting, means for the output voltage of the stabilizer whereby this voltage is made more nearly to compensate for the transformer voltage drop as it varies in phase.

An object of my invention is to provide phase compensating means for voltage stabilizers.

My invention will be better understood from the following description taken in connection with the accompanying drawing and its scope will be pointed out in the appended claims.

Figure 1:
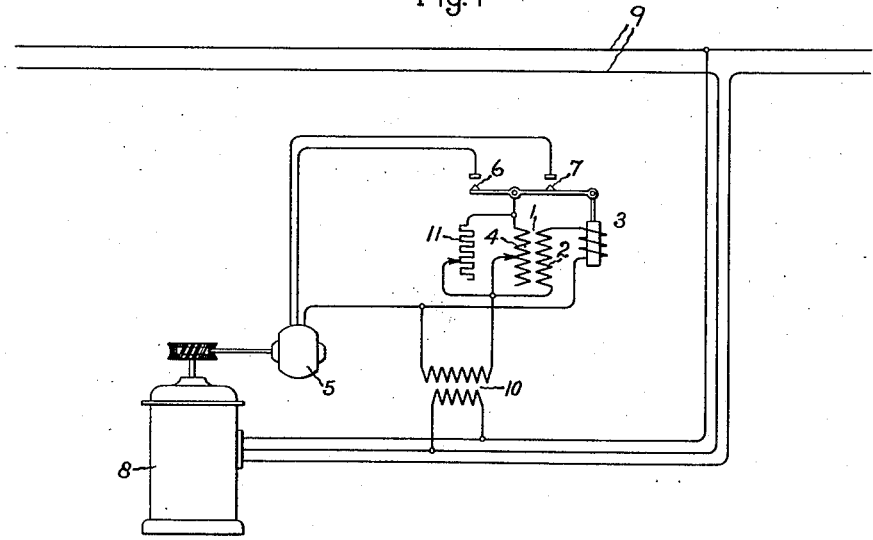
Figure 2:
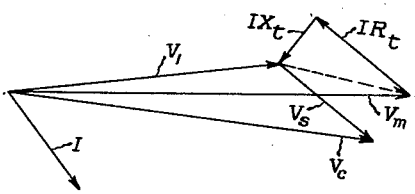
Figure 3:
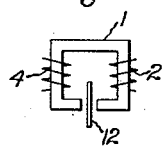
Figure 4:
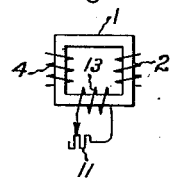

In the drawing, Fig. 1 illustrates diagrammatically an embodiment of my invention, Fig. 2 is a vector diagram for illustrating the operation of the embodiment of my invention shown in Fig. 1, while Figs. 3 and 4 illustrate respectively modifications of the arrangement shown in Fig. 1.

In Fig. 1 of the drawing, 1 is a voltage stabilizing transformer whose secondary winding 2 is connected in a control circuit for operating a contact making voltmeter 3 and whose primary winding 4 is connected in a power circuit for operating a motor 5. Motor 5, which is a reversible motor, has its direction of rotation controlled by contacts 6 and 7 on meter 3. It is mechanically connected to operate an induction voltage regulator 8 in the usual manner. This regulator is connected to an alternating current circuit 9 for regulating its voltage and a small supply transformer 10 is connected to energize the control and power circuits from circuit 9.

As will be explained hereinafter, the reactance of stabilizing transformer 1 is made as small as possible by any well known means, such as by interlinking or interwinding its primary and secondary windings so as to provide a minimum leakage reactance. For modifying, or controlling, the phase of the secondary voltage of stabilizing transformer 1, I provide an adjustable resistive impedance 11 connected in parallel with winding 4.

As described in my previously referred to application, the general operation of the stabilizer is such that when a change in voltage on circuit 9 causes the contact making voltmeter 3 to start motor 5, the stabilizer 1 produces in secondary winding 2 a voltage which tends to compensate for the impedance voltage drop in transformer 10 which is caused by the relatively heavy current taken by motor 5. Without resistance 11 and with an ordinary stabilizing transformer having a fairly high leakage reactance, the voltage produced by secondary winding 2 will be in phase with the reactance voltage drop in transformer 10. For any given power factor of motor 5 this voltage of secondary winding 2 may be made of such a value that it will completely compensate the contact making voltmeter control circuit for the impedance drop in transformer 10. However, the power factor of motor 5 varies throughout its operation with the result that considerable errors are introduced in the compensation. These errors are accentuated by the fact that in small supply transformers such as transformer 10 the resistance is usually considerably larger than the reactance of the transformer. By providing resistance 11, the making transformer 1 is a low reactance transformer, the voltage across the primary winding of stabilizer 1 may be made to be proportional to the resistance drop in the transformer 10.

This is shown in Fig. 2 where $V_m$ is the voltage of transformer 10 when the contact making voltmeter 3 is in its balanced neutral position. The vector I is the motor current which flows when the contact making voltmeter closes its contacts 6 or 7. $V_1$ is the load voltage of transformer 10 which differs from $V_m$ by the sum of the resistance drop $IR_t$ and the reactance drop $IX_t$ in transformer 10. The stabilizer voltage $V_s$ is shown added to $V_1$ to give $V_c$ the compensated voltage of the contact making voltmeter control circuit. As shown, $V_s$ is in phase, or more correctly, in phase opposition with the IR drop in the transformer 10 and $V_c$ is more nearly equal to $V_m$ than it would be if $V_s$ were in phase with the IX drop only.

It should be understood that Fig. 2 is only approximate and that it is used for illustrating the principle of operation of one embodiment of my invention, rather than as showing the exact relation of the various voltages and currents in the circuit.

Thus I have found that a certain error is introduced by the conductive connection of resistance 11 in Fig. 1. This is due to the face that with respect to the contact making voltmeter current, the stabilizer acts as a transformer having across the secondary winding a resistance load. The contact making voltmeter current as transformed through the stabilizer, flows in one direction through the secondary winding of the stabilizer, which is ordinarily the primary winding, and in the opposite direction through the resistance 11. When motor 5 is energized, the motor current passes in the same direction through both the stabilizer primary winding 4 and the resistance 11 and adds vectorially to the contact making voltmeter current in these elements. With this arrangement, it is possible to obtain correct compensation for one condition of power factor but not with varying power factor because the motor current vectors are superimposed upon two contact making voltmeter current vectors which are 180 degrees apart and the resultant currents obtained do not cause the drop in the stabilizer and resistance which is required for correct compensation.

In order to overcome this error I have provided in Fig. 3 an arrangement whereby the phase controlling resistive impedance element which is associated with the stabilizer is inductively coupled to the stabilizer rather than conductively coupled as in Fig. 1. Thus in this figure I have shown the resistive impedance as a non-magnetic electrically conducting shield 12 which is preferably made of copper. In this arrangement the stabilizer flux induces eddy currents in the shield 12 which thereby acts as a resistance load on the stabilizer transformer. By varying the width and thickness of this shield the value of the resistive load may be made anything desired. Thus, by suitably choosing the dimensions of shield 12, the stabilizer 1 may be made to have substantially the equivalent impedance of supply transformer 10 so that the voltage induced in the secondary winding 2 of the stabilizer will be substantially in phase opposition to the voltage drop in transformer 10 at all power factors of motor current.

In Fig. 4 is illustrated another way of inductively coupling the resistive impedance to the stabilizing transformer 1. In this arrangement a tertiary winding 13 is provided on the transformer and this winding is connected across to resistance 11.

While I have shown and described particular embodiments of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. The combination with a transformer, of a power circuit and a control circuit energized therefrom, a relatively low reactance voltage stabilizing transformer having its primary winding connected in said power circuit and its secondary winding connected in said control circuit, and an impedance connected in parallel with said primary winding.

2. The combination with a transformer, of a power circuit and a control circuit energized therefrom, a relatively low reactance voltage stabilizing transformer having its primary winding connected in said power circuit and its secondary winding connected in said control circuit, and a resistive impedance connected in parallel with said primary winding.

3. The combination with a transformer, of a power circuit and a control circuit energized therefrom, means in said control circuit for controlling the energization of said power circuit, a voltage stabilizing transformer having its primary winding connected in said power circuit and its secondary winding connected in said control circuit, and an impedance inductively coupled to said stabilizing transformer.

4. The combination with a transformer, of a power circuit and a control circuit energized therefrom, means in said control circuit for controlling the energization of said power circuit, a voltage stabilizing transformer having its primary winding connected in said power circuit and its secondary winding connected in said control circuit, said transformer having an air gap in its core, and a shield of electrical conducting material in said gap.

5. The combination with a transformer, of a power circuit and a control circuit energized therefrom, means in said control circuit for controlling the energization of said power circuit, a voltage stabilizing transformer having its primary winding connected in said power circuit and its secondary winding connected in said control circuit, a tertiary winding on said stabilizing transformer, and an impedance connected across said tertiary winding.

6. The combination with a transformer, of a power circuit and a control circuit energized therefrom, means in said control circuit for controlling the energization of said power circuit, a voltage stabilizing transformer having its primary winding connected in said power circuit and its secondary winding connected in said control circuit, a tertiary winding on said stabilizing transformer, and a resistive impedance connected across said tertiary winding.

7. In combination, a supply transformer, a circuit connected to said supply transformer, said circuit having a load which draws a relatively heavy current through said supply transformer, said current being variable in both magnitude and phase, a second circuit connected to said supply transformer, a contact making voltmeter for controlling said load connected to be energized from said second circuit, a stabilizing transformer having windings connected in each of said circuits respectively, and means associated with said stabilizing transformer for shifting the voltage induced in its winding which is in said second circuit toward phase opposition with the voltage drop in said supply transformer.

8. In combination, a supply transformer having a resistance which is higher than its reactance, a circuit connected to said supply transformer, said circuit having a load which draws a relatively heavy current through said supply transformer, said current being variable in both magnitude and phase, a second circuit connected to said supply transformer, a contact making voltmeter for controlling said load connected to be energized from said second circuit, a relatively low leakage reactance stabilizing transformer having windings connected in each of said circuits respectively, and means including a resistance coupled to said stabilizing transformer for shifting the voltage induced in the winding of said stabilizing transformer which is in said second circuit into substantially phase opposition with the resistance voltage drop in said supply transformer.

FRANKLIN J. CHAMPLIN.